US008787285B2

(12) United States Patent
Deb et al.

(10) Patent No.: US 8,787,285 B2
(45) Date of Patent: Jul. 22, 2014

(54) DUAL ASSOCIATION LOCAL AREA NETWORK TRANSCEIVER AND METHODS FOR USE THEREWITH

(75) Inventors: Manas Deb, San Jose, CA (US); Hsiang-Ling Li, Irvine, CA (US); Chiu Ngok Eric Wong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 99 days.

(21) Appl. No.: 13/331,240

(22) Filed: Dec. 20, 2011

(65) Prior Publication Data

US 2013/0107818 A1     May 2, 2013

Related U.S. Application Data

(60) Provisional application No. 61/552,835, filed on Oct. 28, 2011.

(51) Int. Cl.
| | | |
|---|---|---|
| *H04W 4/00* | (2009.01) | |
| *H04B 1/00* | (2006.01) | |
| *H04W 88/06* | (2009.01) | |
| *H04W 88/02* | (2009.01) | |
| *H04W 72/04* | (2009.01) | |

(52) U.S. Cl.
CPC ............. *H04B 1/005* (2013.01); *H04W 88/06* (2013.01); *H04W 88/02* (2013.01); *H04W 72/04* (2013.01)
USPC ........... 370/329; 370/310; 370/331; 370/389; 455/436; 455/437; 455/438

(58) Field of Classification Search
None
See application file for complete search history.

(56) References Cited

U.S. PATENT DOCUMENTS

| | | | |
|---|---|---|---|
| 6,879,600 B1 * | 4/2005 | Jones et al. .................... | 370/466 |
| 7,054,296 B1 * | 5/2006 | Sorrells et al. ................ | 370/338 |
| 2005/0208900 A1 | 9/2005 | Karacaoglu | |
| 2006/0215601 A1 * | 9/2006 | Vleugels et al. .............. | 370/328 |
| 2008/0043673 A1 * | 2/2008 | Johnson et al. ................ | 370/331 |
| 2010/0111033 A1 * | 5/2010 | Erceg et al. .................... | 370/331 |
| 2010/0225414 A1 | 9/2010 | Gorbachov | |
| 2011/0122854 A1 | 5/2011 | De Lind Van Wijngaarden | |
| 2012/0034870 A9 * | 2/2012 | Desai et al. .................. | 455/41.2 |
| 2013/0028147 A1 * | 1/2013 | Black ............................ | 370/277 |

FOREIGN PATENT DOCUMENTS

| | | | |
|---|---|---|---|
| EP | 1261142 A1 | 11/2002 | |
| EP | 1492244 A1 | 12/2004 | |
| KR | 20040049528 A | 6/2004 | |

OTHER PUBLICATIONS

European Search Report; EP Application No. 12007185.7; Feb. 11, 2013; 3 pages.

* cited by examiner

*Primary Examiner* — Ian N Moore
*Assistant Examiner* — Latresa McCallum
(74) *Attorney, Agent, or Firm* — Garlick & Markison; Bruce E. Stuckman

(57) ABSTRACT

A radio frequency (RF) transceiver includes an RF section including an RF receiver operable to convert a received RF signal into inbound data and an RF transmitter to convert outbound data into a transmit signal in accordance with a local area network protocol. A processing module configures the RF section for communication with a first remote device via a first frequency channel of the local area network protocol and configures the RF section for communication with a second remote device via a second frequency channel of the local area network protocol to maintain simultaneous association with both the first remote device and the second remote device.

20 Claims, 5 Drawing Sheets

DUAL ASSOCIATION LOCAL AREA NETWORK TRANSCEIVER AND METHODS FOR USE THEREWITH

CROSS REFERENCE TO RELATED PATENTS

The present application claims priority based on 35 U.S.C. §119 to the provisionally filed application entitled, LOCAL AREA NETWORK TRANSCEIVER AND METHODS FOR USE THEREWITH, having Ser. No. 61/552,835, filed on Oct. 28, 2011, and having the contents of which are incorporated herein for any and all purposes, by reference thereto.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication and more particularly to antennas used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

Other disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
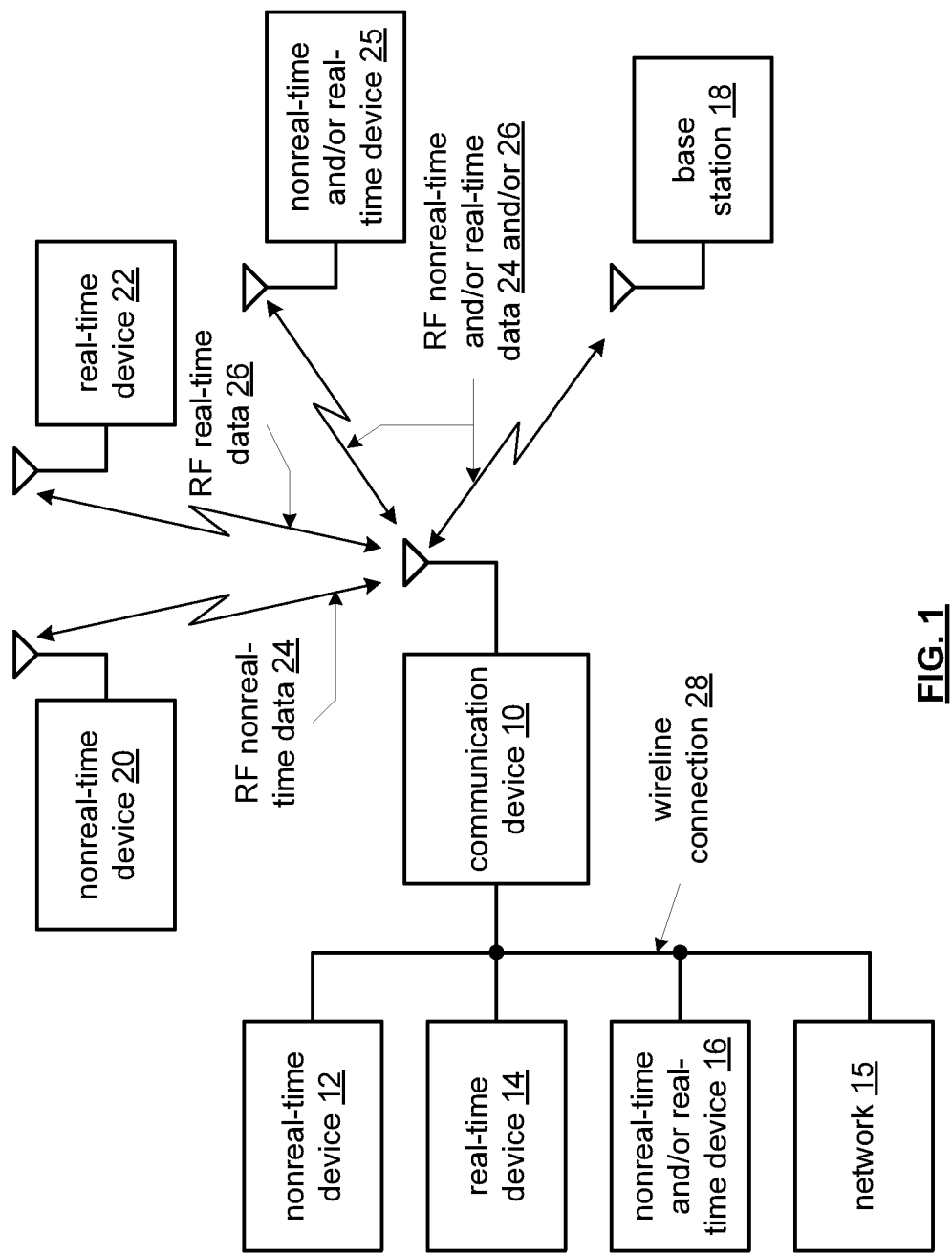
FIG. 1 is a schematic block diagram of an embodiment of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with network 15, non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11a, ac, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a local area network device, personal area network device or other wireless network device, a personal digital assistant, game console, personal computer, laptop computer, or other device that performs one or more functions that include communication of voice and/or data via wireline connection 28 and/or the wireless communication path. Further communication device 10 can be an access point, base station or other network access device that is coupled to a network 15 such at the Internet or other wide area network, either public or private, via wireline connection 28. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a wireless transceiver that includes one or more features or functions of the present invention. Such wireless transceivers shall be described in greater detail in association with FIGS. 3-5 that follow.

Figure 2:
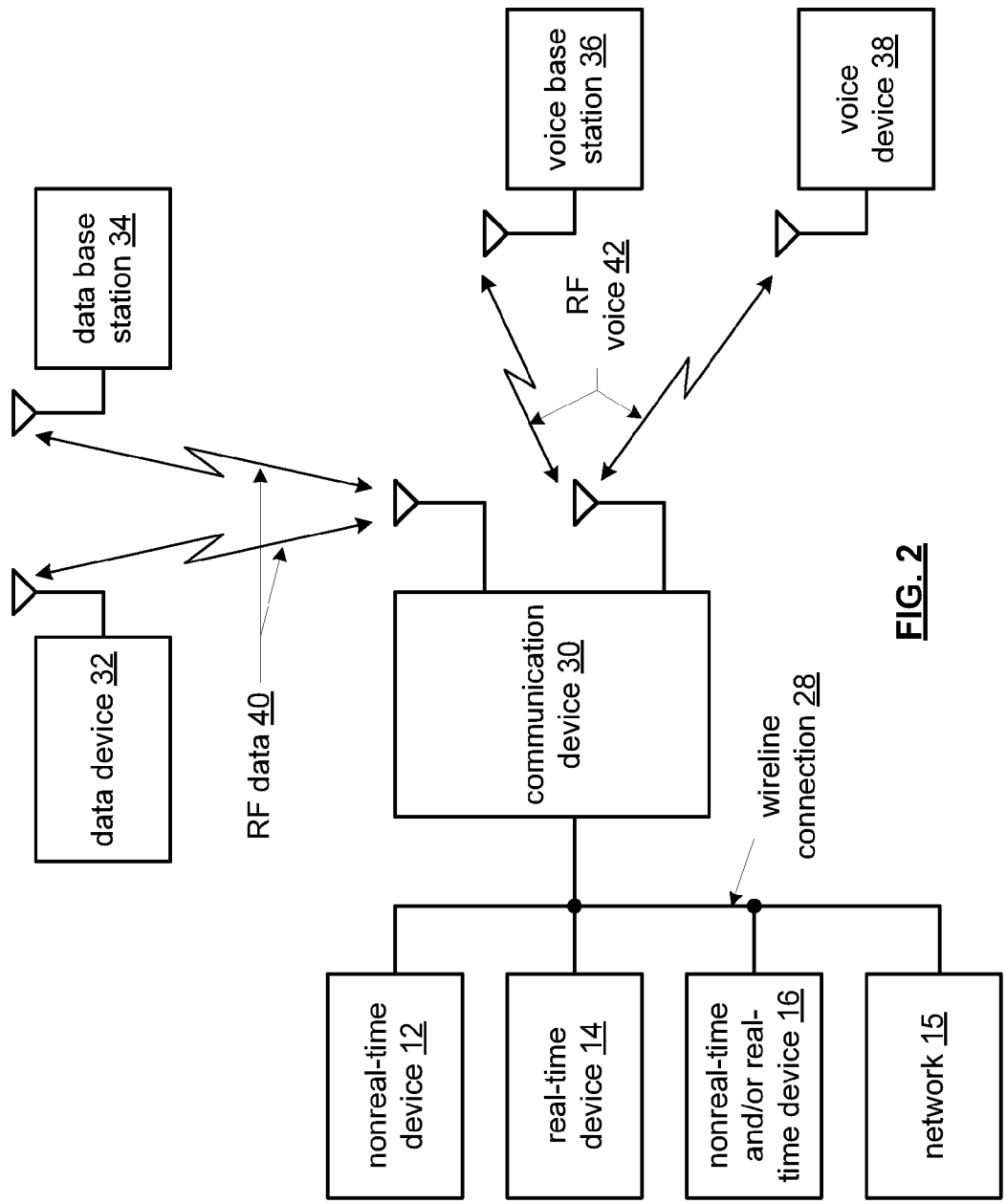
FIG. 2 is a schematic block diagram of another embodiment of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two or more separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
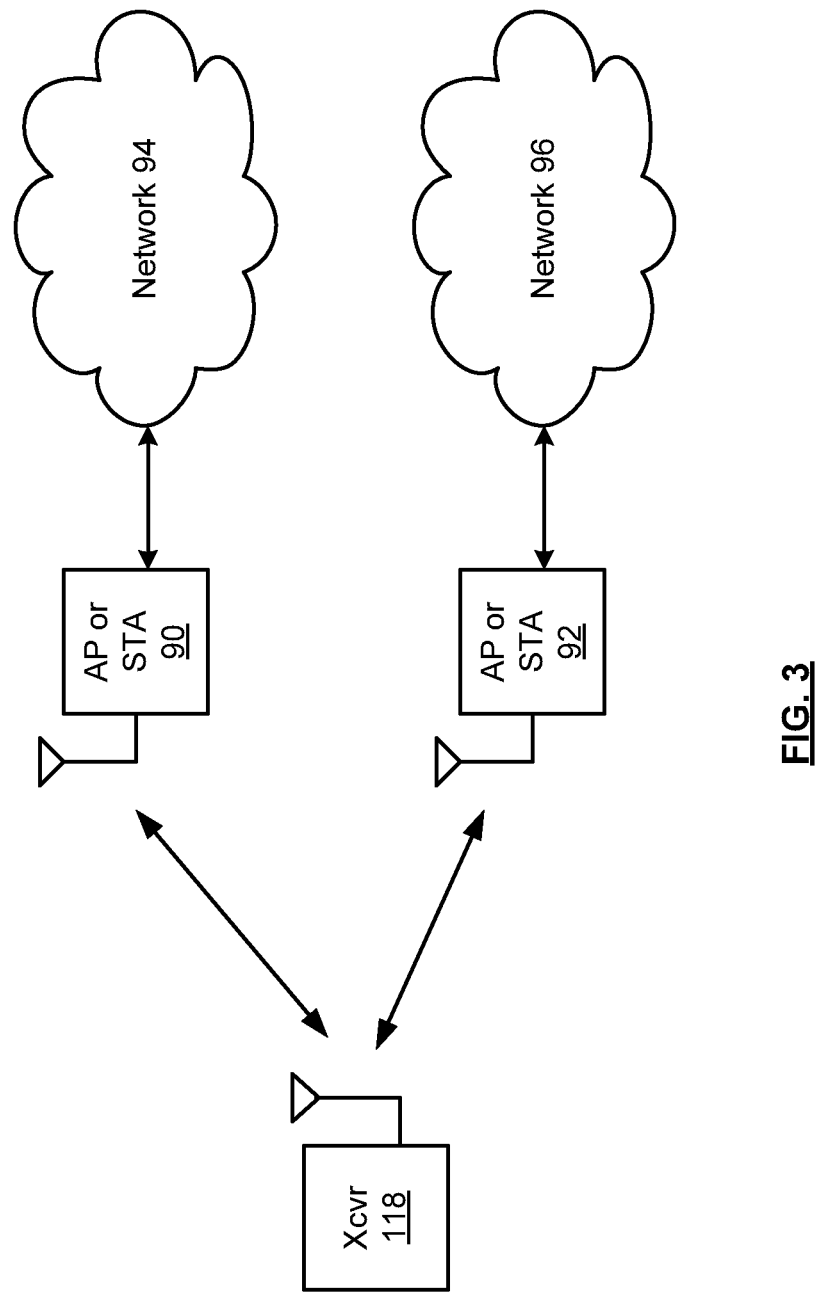
FIG. 3 is a schematic block diagram of an embodiment of an RF transceiver 118 in accordance with the present invention.

FIG. 3 is a schematic block diagram of an embodiment of a RF transceiver 118 in accordance with the present invention. In particular, RF transceiver 118 is presented, for use in communication devices 10 or 30, base station 18, non-real-time device 20, real-time device 22, and non-real-time, real-time device 25, data device 32 and/or data base station 34, and voice base station 36 and/or voice device 38 or any other 802.11 compliant STA. In an ordinary 802.11 system, a STA associates with one AP in an infrastructure BSS network, or with one STA in an independent BSS network. After association, wireless data can be transferred between the STA and AP (in infrastructure BSS) or between one STA and another STA (in independent BSS).

The RF transceiver 118 implements a pseudo-simultaneous dual association feature that allows it to associate contemporaneously with multiple APs and/or STAs, such as AP or STA 90 coupled to network 94 and AP or STA 92 coupled to network 96, using a single set of MIMO radios. These STAs/APs can be in the same band or in different bands. This feature uses hardware acceleration and/or microcode, to switch the radio between channels and bands in a very short time, thus allowing for a TDMA scheme of data transfer between multiple associations. To the user, it appears that the transceiver 119 has multiple sets of MIMO radios, each tuned to the different channels/bands on which the association was made. In implementation, a single MIMO radio supports both associations via fast switching and time division multiplexing. This feature also supports a smart scheduling scheme based on traffic pattern to optimize data throughput while switching the radio between the different channels/bands.

The operation of RF transceiver 118 can be described in conjunction with the following example. Consider the case where RF transceiver 118 is implemented in an 802.11ac STA and AP or STA 90 and AP or STA 92 are both access points (i.e. AP 90 and AP 92 in this example). The RF transceiver 118 performs a scan and associates with AP 90 on channel 6 at a frequency of 2437 MHz. The RF transceiver 118 tags channel 6 and stores channel configuration data for this channel in a channel cache. The RF transceiver performs another scan and associates with AP 92 on channel 40 at a frequency of 5200 MHz. The RF transceiver 118 tags channel 40 and also stores channel configuration data for this second channel in the channel cache. The RF transceiver 118 then splits time communicating contemporaneously with networks 94 and 96 via both AP 90 and AP 92, simultaneously maintaining associations with both access points. When it is time to switch between channel 40 and channel 6 (and vice versa), the RF transceiver retrieves that channel configuration data for the new channel from the channel cache and changes frequencies, receiver settings and transmitter settings in order to tune the RF transceiver 118 to the new channel. In an embodiment of the present invention, the RF transceiver is capable of switching between channels in less than 1 millisecond.

It should be noted that while the example above describes association between an 802.11ac STA with two different access points, in other operation, the RF transceiver 118 can simultaneously associate with both an access point and another STA such as a peripheral or other remote device that may or may not be connected with an associated data network. Further, while the example above describes a scenario where the RF transceiver 118 contemporaneously communicates via two frequencies channels in two different non-contiguous frequency bands, RF transceiver 118 could likewise communicate via two different frequencies within the same frequency band. In addition, while the example above described simultaneous association with two remote devices, simultaneous association with three or more devices can likewise be implemented via the techniques described herein.

Figure 4:
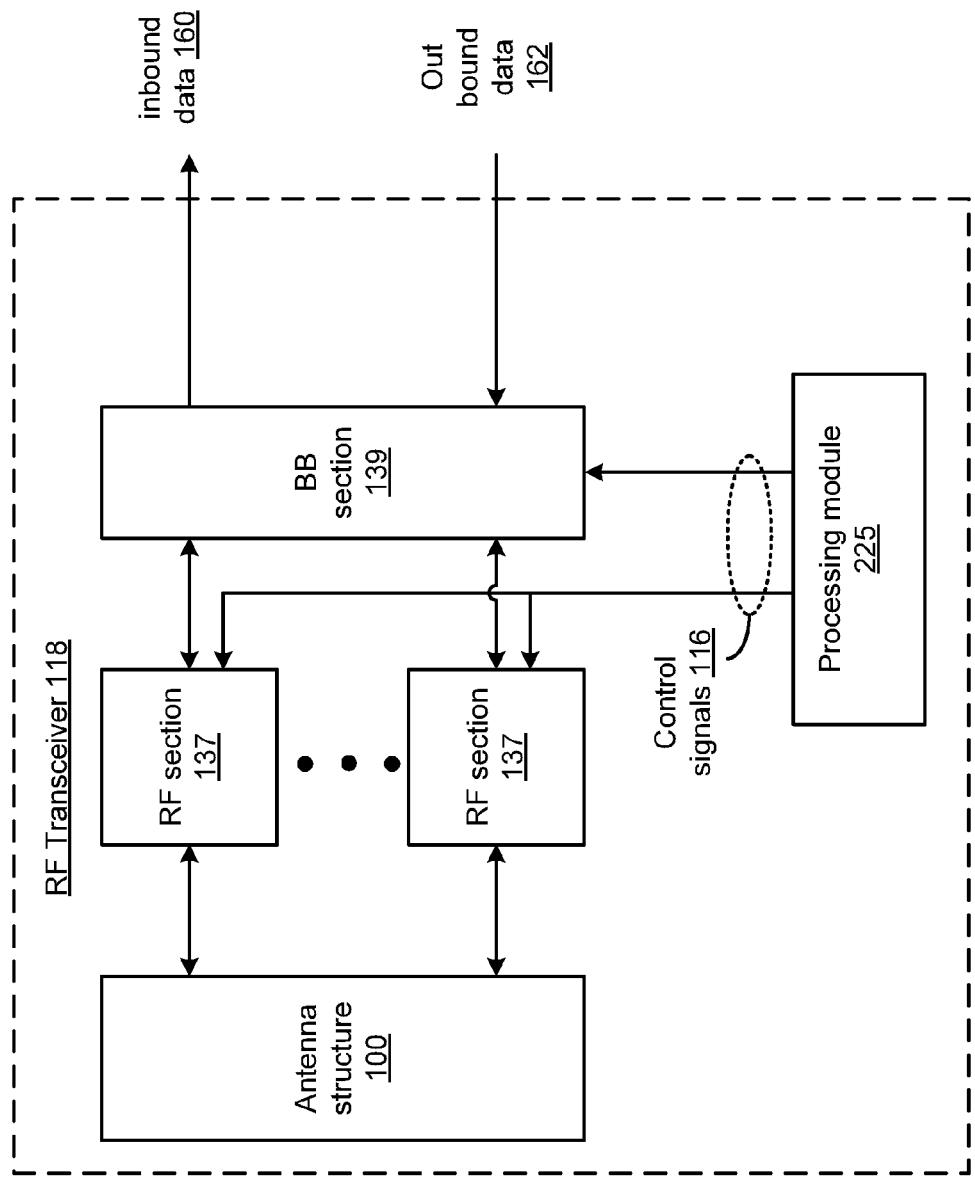
FIG. 4 is a schematic block diagram of an embodiment of an RF transceiver 118 in accordance with the present invention.

FIG. 4 is a schematic block diagram of an embodiment of a RF transceiver 118 in accordance with the present invention. In particular, a configurable RF transceiver 118 is presented. RF sections 137 include multiple separate transmitter and receiver chains which up-convert baseband signals for transmission by the antenna or antennas of antenna structure 100 and down convert signals received via the antenna structure 100 to baseband. RF transceiver 118 presents a structure that can be quickly switched between two different local area network channels, based on control signals 116 generated by processing module 225, in order to maintain simultaneous association with a plurality of access points or other stations.

In particular, a processing module 225 is operable to configure the RF section 137 for communication with a first remote device via a first frequency channel of the local area network protocol and to configure the RF section 137 for communication with a second remote device via a second frequency channel of the local area network protocol to maintain simultaneous association with both the first remote device and the second remote device. Processing module 225 further operates to configure baseband section 139 to process outbound data 162 into baseband transmit signals and process baseband receive signals into inbound data 160 under control of control signals 116. Further examples regarding the implementation and operation of RF transceiver 118, including several optional functions and features, are presented in conjunction with FIG. 5 that follows.

Figure 5:
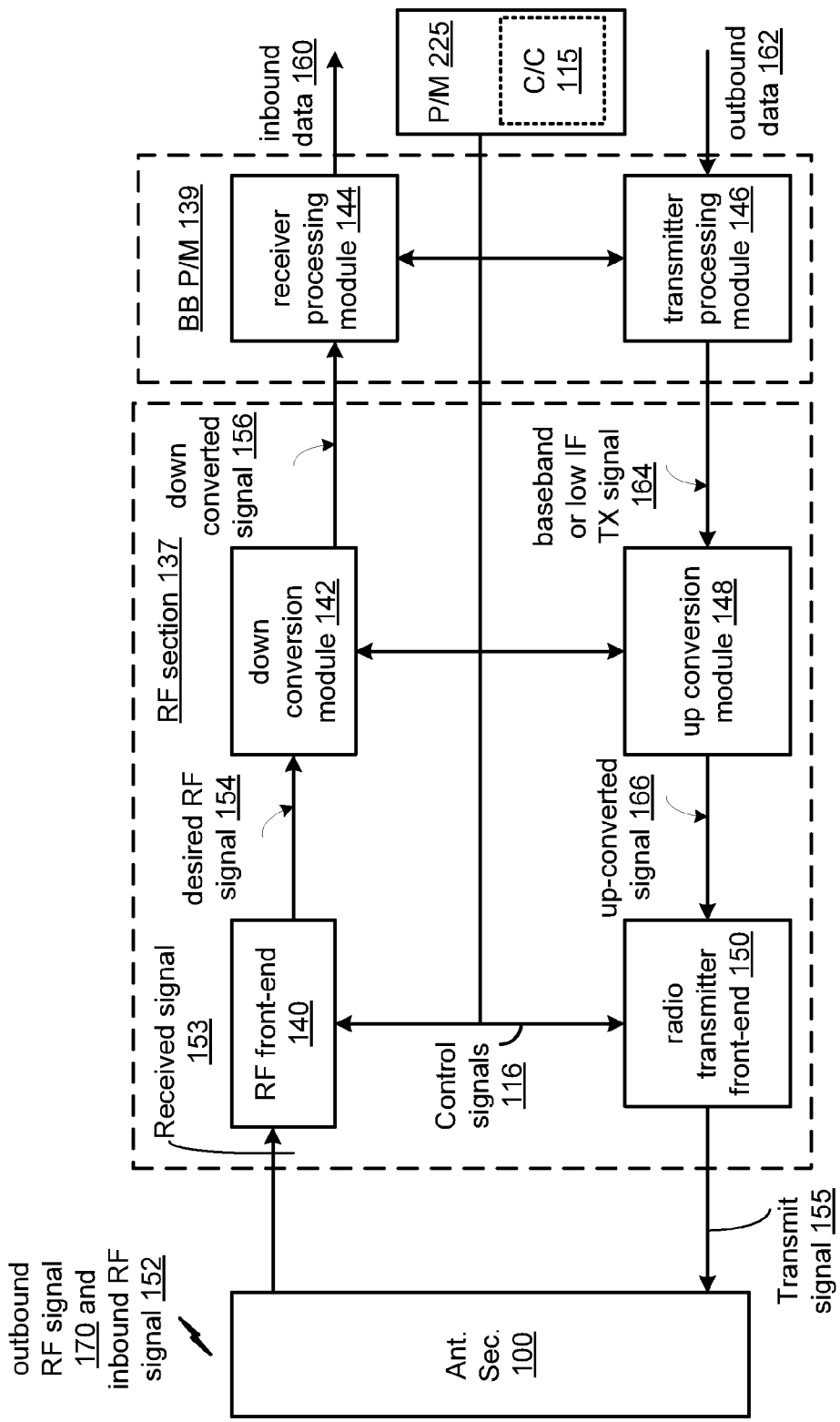
FIG. 5 is a schematic block diagram of an embodiment of an RF section 137 in accordance with the present invention.

FIG. 5 is a schematic block diagram of an embodiment of an RF section 137 in accordance with the present invention. A portion of RF transceiver 118 is shown that includes a single RF section 137 having an RF receiver section including RF front-end 140 and down conversion module 142 and an RF transmitter section that includes up conversion module 148 and radio transmitter front-end 150. RF transceiver 125 includes an RF transmitter 129, and an RF receiver 127. The baseband processing module 139 includes a receiver processing module 144 and a transmitter processing module 146.

As shown, the receiver and transmitter are each coupled to antenna structure 100 to produce outbound RF signal 170 from transmit signal 155 and to produce received signal 153 from inbound signal 152. Antenna structure 100 can include a single antenna or a multiple antenna structure that includes two or more antennas such as a multiple input multiple output (MIMO) antenna structure, diversity antenna structure, phased array or other controllable antenna structure that includes a plurality of antennas and is coupled to other RF sections 137. Each of these antennas may be fixed, programmable, and antenna array or other antenna configuration. Also, the antenna structure 100 may depend on the particular standard(s) to which the wireless transceiver is compliant and the applications thereof.

In operation, the transmitter processing module 146 packetizes outbound data 162 in accordance with a local area network protocol, either standard or proprietary, to produce baseband or low intermediate frequency (IF) transmit (TX) signals 164 that includes an outbound symbol stream that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, a local oscillator such as a voltage controlled oscillator, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure 100 transmits the outbound RF signals 170.

The RF section 137 receives inbound RF signals 152 via the antenna structure 100 that operates to process the inbound RF signal 152 into received signal 153 for the receiver front-end 140. The RF front-end 140 includes a low noise amplifier of adjustable gain that amplifies the received signal 153 to produce the desired RF signal 154. The low noise amplifier can include bandpass filtration.

The down conversion module 142 includes a mixing section, a local oscillator such as a voltage controlled oscillator, an analog to digital conversion (ADC) module, and may also include a filtering and/or gain module. The mixing section converts the desired RF signal 154 into a down converted signal 156, such as an analog baseband or low IF signal, based on a receiver local oscillation. The ADC module converts the analog baseband or low IF signal into a digital baseband or low IF signal. The filtering and/or gain module high pass and/or low pass filters the digital baseband or low IF signal to produce a baseband or low IF signal 156 that includes an inbound symbol stream. Note that the ordering of the ADC module and filtering and/or gain module may be switched, such that the filtering and/or gain module is an analog module. It should be noted that the transmitter local oscillation and the receiver local oscillation can be generated by a single local oscillator or a plurality of local oscillators.

The receiver processing module 144 processes the baseband or low IF signal 156 in accordance with a millimeter wave protocol, either standard or proprietary to produce inbound data 160. The processing performed by the receiver processing module 144 can include, but is not limited to, digital intermediate frequency to baseband conversion, demodulation, demapping, depuncturing, decoding, and/or descrambling.

In an embodiment of the present invention, receiver processing module 144, transmitter processing module 146, and processing module 225 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when these processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the processing module 144, transmitter processing module 146 and processing module 225 are shown separately, it should be understood that these elements could be implemented separately, together through the operation of one or more shared processing devices or in any combination of separate and shared processing.

Processing module 225 is operable to configure the RF section 137 for communication with a first remote device via a first frequency channel of the local area network protocol and to configure the RF section 137 for communication with a second remote device via a second frequency channel of the local area network protocol to maintain simultaneous association with both the first remote device and the second remote device.

In an embodiment of the present invention, the processing module 225 implements a software driver that controls the operation of the various components of RF section 137 to operate the physical (PHY) layer of the local area network protocol based on channel configuration data that controls the configuration of the RF section 137 and optionally the baseband processing module 139 for the current channel in use. A channel cache 115, such as local or attached memory device, is operable to store first channel configuration data for configuring the RF section 137 for communication with the first remote device via the first frequency channel and to store second channel configuration data for configuring the RF section 137 for communication with the second remote device via the second frequency channel. To maintain the simultaneous association, the processing module 225 is operable to configure the RF section 137 to switch between the first frequency channel and the second frequency channel.

The processing module 225 temporarily disables the driver during the switching process and initiates a calibration of the voltage controlled oscillator (VCO) or VCOs employed by the down conversion module 142 and up conversion module 148 to the new local oscillator frequency of the second frequency channel. The second channel configuration data is retrieved from the channel cache and is used to overwrite the first channel configuration data in the driver. Once the VCO calibration is complete and the new channel configuration data is loaded in the driver, the driver can be enabled for operation at the new channel frequency. Transitions from the second channel frequency to the first channel frequency can be implemented in a similar fashion.

The channel configuration data for a particular frequency channel can include local oscillator data for configuring the down conversion module 142 and the up conversion module 148 to the proper frequencies of the particular channel and further calibrating one or more voltage controlled oscillators at these frequencies. The channel configuration data can also include power amplifier predistortion data used by transmitter processing module 146 for linearizing a power amplifier of the radio transmitter front-end 150 at the particular channel frequency. The channel configuration data can also include transmit power control data, mixed signal calibration data, receiver gain data and other parameters of the RF section 137 and baseband section 139 that vary based on the selected channel.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/ or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A radio frequency (RF) transceiver comprising:
at least one RF section including an RF receiver operable to convert a received RF signal into inbound data and an RF transmitter to convert outbound data into a transmit signal in accordance with a local area network protocol;
a processing module, coupled to the at least one RF section, operable to configure the at least one RF section for communication with a first remote device via a first frequency channel of the local area network protocol and to configure the at least one RF section for communication with a second remote device via a second frequency channel of the local area network protocol to maintain simultaneous association with both the first remote device and the second remote device by time division multiplexing between the communication with the first remote device via the first frequency channel of the local area network protocol and the communication with the second remote device via the second frequency channel of the local area network protocol, wherein the processing module includes:
a channel cache operable to store first channel configuration data for configuring the at least one RF section for communication with the first remote device via the first frequency channel and to store second channel configuration data for configuring the at least one RF section for communication with the second remote device via the second frequency channel;
wherein the processing module is operable to configure the at least one RF section to switch between the first frequency channel and the second frequency channel by:

calibrating at least one voltage controlled oscillator of the at least one RF section;
retrieving the second channel configuration data corresponding from the channel cache; and
overwriting the first channel configuration data with the second channel configuration data;
wherein the at least one RF section provides fast switching between the first frequency channel and the second frequency channel to maintain the simultaneous association with both the first remote device and the second remote device via the time division multiplexing.

2. The RF transceiver of claim 1, wherein the first remote device is a first access point coupled to a first data network and wherein the second remote device is a second access point coupled to a second data network.

3. The RF transceiver of claim 1, wherein the first remote device is an access point coupled to a data network and wherein the second remote device is a local area network station.

4. The RF transceiver of claim 1, wherein the local area network protocol is an 802.11 standard protocol.

5. The RF transceiver of claim 1, wherein at least one of, the first channel configuration data and the second channel configuration data, includes local oscillator data for configuring at least one down conversion module and at least one up conversion module of the at least one RF section.

6. The RF transceiver of claim 1, wherein at least one of, the first channel configuration data and the second channel configuration data, includes power amplifier predistortion data for linearizing a power amplifier of the at least one RF section.

7. The RF transceiver of claim 1, wherein at least one of, the first channel configuration data and the second channel configuration data, includes transmit power control data.

8. The RF transceiver of claim 1, wherein at least one of, the first channel configuration data and the second channel configuration data, includes mixed signal calibration data.

9. The RF transceiver of claim 1, wherein at least one of, the first channel configuration data and the second channel configuration data, includes receiver gain data.

10. A radio frequency (RF) transceiver comprising:
at least one RF section including an RF receiver operable to convert a received RF signal into inbound data and an RF transmitter to convert outbound data into a transmit signal in accordance with a local area network protocol;
a processing module, coupled to the at least one RF section, operable to configure the at least one RF section for communication with a first remote device via a first frequency channel of the local area network protocol and to configure the at least one RF section for communication with a second remote device via a second frequency channel of the local area network protocol to maintain simultaneous association with both the first remote device and the second remote device by time division multiplexing between the communication with the first remote device via the first frequency channel of the local area network protocol and the communication with the second remote device via the second frequency channel of the local area network protocol, wherein the processing module includes:
a channel cache operable to store first channel configuration data for configuring the at least one RF section for communication with the first remote device via the first frequency channel and to store second channel configuration data for configuring the at least one RF section for communication with the second remote device via the second frequency channel;
wherein the processing module is operable to configure the at least one RF section to switch between the first frequency channel and the second frequency channel by:
calibrating at least one voltage controlled oscillator of the at least one RF section;
retrieving the second channel configuration data corresponding from the channel cache; and
overwriting the first channel configuration data with the second channel configuration data;
wherein the first remote device is a first access point coupled to a first data network wherein the second remote device is a second access point coupled to a second data network and wherein the local area network protocol is an 802.11 standard protocol;
wherein the at least one RF section provides fast switching between the first frequency channel and the second frequency channel to maintain the simultaneous association with both the first remote device and the second remote device via the time division multiplexing.

11. The RF transceiver of claim 10, wherein the first remote device is an access point coupled to a data network and wherein the second remote device is a local area network station.

12. The RF transceiver of claim 10, wherein the local area network protocol is an 802.11 standard protocol.

13. The RF transceiver of claim 10, wherein at least one of, the first channel configuration data and the second channel configuration data, includes local oscillator data for configuring at least one down conversion module and at least one up conversion module of the at least one RF section.

14. The RF transceiver of claim 10, wherein at least one of, the first channel configuration data and the second channel configuration data, includes power amplifier predistortion data for linearizing a power amplifier of the at least one RF section.

15. The RF transceiver of claim 10, wherein at least one of, the first channel configuration data and the second channel configuration data, includes transmit power control data.

16. The RF transceiver of claim 10, wherein at least one of, the first channel configuration data and the second channel configuration data, includes mixed signal calibration data.

17. The RF transceiver of claim 10, wherein at least one of, the first channel configuration data and the second channel configuration data, includes receiver gain data.

18. A radio frequency (RF) transceiver comprising:
at least one RF section including an RF receiver operable to convert a received RF signal into inbound data and an RF transmitter to convert outbound data into a transmit signal in accordance with a local area network protocol;
a processing module, coupled to the at least one RF section, operable to configure the at least one RF section for communication with a first remote device via a first frequency channel of the local area network protocol and to configure the at least one RF section for communication with a second remote device via a second frequency channel of the local area network protocol to maintain simultaneous association with both the first remote device and the second remote device by time division multiplexing between the communication with the first remote device via the first frequency channel of the local area network protocol and the communication with the second remote device via the second frequency channel of the local area network protocol, wherein the processing module includes:
a channel cache operable to store first channel configuration data for configuring the at least one RF section for communication with the first remote device via the first frequency channel and to store second channel configuration data for configuring the at least one RF section for communication with the second remote device via the second frequency channel;

wherein the processing module is operable to configure the at least one RF section to switch between the first frequency channel and the second frequency channel by:

calibrating at least one voltage controlled oscillator of the at least one RF section;

retrieving the second channel configuration data corresponding from the channel cache; and overwriting the first channel configuration data with the second channel configuration data;

wherein the first remote device is a first access point and the second remote device is a second access point;

wherein the at least one RF section provides fast switching between the first frequency channel and the second frequency channel to maintain the simultaneous association with both the first remote device and the second remote device via the time division multiplexing.

19. The RF transceiver of claim 18, wherein at least one of, the first channel configuration data and the second channel configuration data, includes power amplifier predistortion data for linearizing a power amplifier of the at least one RF section.

20. The RF transceiver of claim 18, wherein at least one of, the first channel configuration data and the second channel configuration data, includes transmit power control data.

* * * * *